(12) United States Patent
Tournier

(10) Patent No.: US 8,348,569 B2
(45) Date of Patent: Jan. 8, 2013

(54) CAGE FOR BLIND SECURING OF OBJECTS

(75) Inventor: Ludovic Tournier, St. Marcellin (FR)

(73) Assignee: ITW Fastex France, Saint-Marcellin (FR)

( * ) Notice: Subject to any disclaimer, the term of this patent is extended or adjusted under 35 U.S.C. 154(b) by 286 days.

(21) Appl. No.: 11/814,892

(22) PCT Filed: Feb. 6, 2006

(86) PCT No.: PCT/IB2006/000220
§ 371 (c)(1),
(2), (4) Date: Jul. 26, 2007

(87) PCT Pub. No.: WO2006/082510
PCT Pub. Date: Aug. 10, 2006

(65) Prior Publication Data
US 2008/0145175 A1 Jun. 19, 2008

(30) Foreign Application Priority Data
Feb. 7, 2005 (FR) ...................................... 05 01217

(51) Int. Cl.
*F16B 37/04* (2006.01)
(52) U.S. Cl. ........ 411/108; 411/112; 411/182; 411/522; 411/549
(58) Field of Classification Search ............... 411/21, 411/24, 80.2, 80.5, 104–109, 111–113, 182, 411/349, 549, 553, 551, 970, 522
See application file for complete search history.

(56) References Cited

U.S. PATENT DOCUMENTS

| | | | | |
|---|---|---|---|---|
| 2,306,975 A | * | 12/1942 | Pender | 52/716.7 |
| RE22,618 E | * | 3/1945 | Johnson | 411/112 |
| 2,539,172 A | * | 1/1951 | Andrews | 248/27.3 |

(Continued)

FOREIGN PATENT DOCUMENTS

CN 1100783 A 3/1995
(Continued)

OTHER PUBLICATIONS

ISR for PCT/IB2006/000220 mailed May 16, 2006.

*Primary Examiner* — Roberta Delisle
(74) *Attorney, Agent, or Firm* — Lowe Hauptman Ham & Berner LLP

(57) ABSTRACT

The one-piece cage for fixing device to an object by screwing blind to a plate or the like perforated by a square mounting hole, of the kind including that cage and, therein, a threaded part adapted to cooperate screw-fashion with a complementary threaded part to assure the required fixing, and comprising four identical radial lugs extending in two orthogonal diametral directions and whose profile is such that the resulting cross-shape can be inserted with a small clearance into the square hole, which cage is adapted to be inserted with a small clearance into the mounting hole and to bear on the edges of that hole at the end of the introduction of the cage therein, and is characterized in that it takes the general form of an elastically deformable U-shape having four lugs angularly offset at 90° to each other and adapted to receive contiguously between them the four lugs of the threaded part, the lugs being connected in pairs by two symmetrical bridges adapted to bear on the edges of the hole.

21 Claims, 4 Drawing Sheets

U.S. PATENT DOCUMENTS

| | | | |
|---|---|---|---|
| 2,585,728 A * | 2/1952 | Bedford, Jr. | 411/112 |
| 2,632,929 A * | 3/1953 | Poupitch | 24/290 |
| 2,633,886 A * | 4/1953 | Tinnerman | 411/112 |
| 2,687,862 A * | 8/1954 | Crowther | 248/27.3 |
| 2,836,214 A * | 5/1958 | Rapata | 411/182 |
| 2,884,283 A * | 4/1959 | Korol et al. | 384/439 |
| 2,937,682 A * | 5/1960 | Patten | 411/112 |
| 2,940,496 A * | 6/1960 | Patten | 411/112 |
| 2,967,556 A * | 1/1961 | Jaworski | 411/112 |
| 2,975,814 A * | 3/1961 | Tinnerman | 411/182 |
| 3,035,624 A * | 5/1962 | Jaworski | 411/112 |
| 3,126,039 A * | 3/1964 | Fiddler | 411/112 |
| 3,783,922 A | 1/1974 | Petrus | |
| 3,869,958 A * | 3/1975 | Murayama | 411/15 |
| 4,250,732 A * | 2/1981 | Moryl | 72/357 |
| 4,531,870 A | 7/1985 | Moryl et al. | |
| 4,818,164 A * | 4/1989 | Kazyak | 411/82 |
| 4,952,106 A * | 8/1990 | Kubogochi et al. | 411/48 |
| 5,067,863 A * | 11/1991 | Kowalski | 411/85 |
| 5,249,901 A * | 10/1993 | Moore | 411/182 |
| 5,324,147 A * | 6/1994 | Leon | 411/182 |
| 5,348,432 A | 9/1994 | Nagayama | |
| 5,503,492 A * | 4/1996 | Stevens et al. | 403/297 |
| 5,536,125 A * | 7/1996 | Gaw, Jr. | 411/182 |
| 5,593,262 A * | 1/1997 | Gedeon et al. | 411/182 |
| 5,593,263 A * | 1/1997 | Clinch et al. | 411/182 |
| 5,746,559 A * | 5/1998 | Shirai | 411/182 |
| 5,919,019 A * | 7/1999 | Fischer | 411/182 |
| 6,244,805 B1 * | 6/2001 | Everard | 411/182 |
| D464,873 S * | 10/2002 | Nemoto | D8/382 |
| 6,507,976 B2 * | 1/2003 | Ichimaru | 16/82 |
| 6,568,893 B2 * | 5/2003 | LeVey et al. | 411/349 |
| 6,629,809 B2 * | 10/2003 | Vassiliou | 411/173 |
| 7,008,159 B2 * | 3/2006 | Dendo | 411/182 |
| 7,204,666 B2 * | 4/2007 | Hullman et al. | 411/111 |

FOREIGN PATENT DOCUMENTS

| | | |
|---|---|---|
| CN | 1190708 A | 8/1998 |
| FR | 2495244 A | 6/1982 |

* cited by examiner

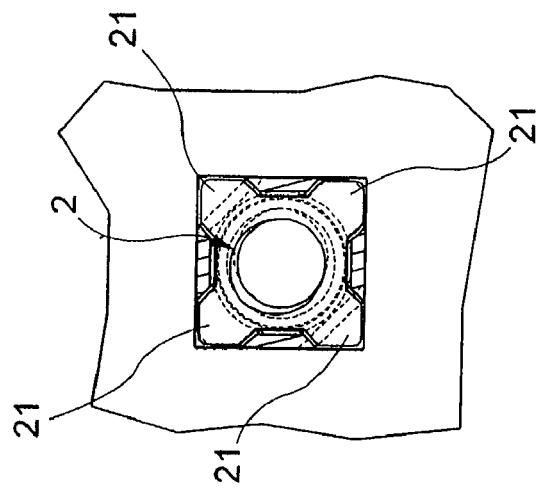
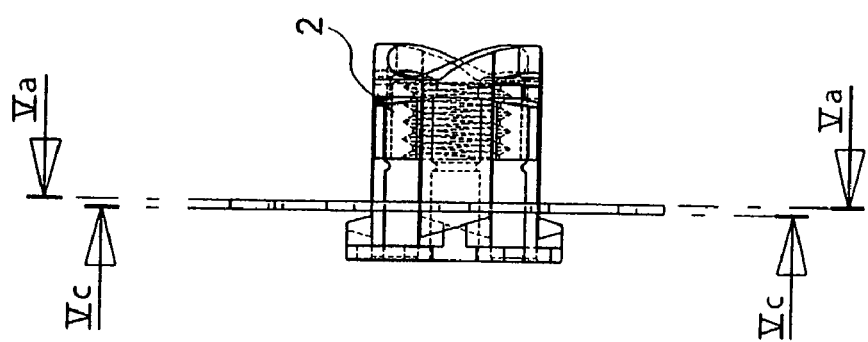
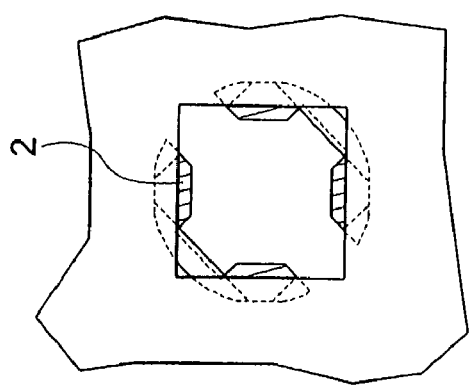
Fig. 5c
Fig. 5b
Fig. 5a

CAGE FOR BLIND SECURING OF OBJECTS

RELATED APPLICATIONS

The present application is based on International Application No. PCT/IB2006/000220 filed Feb. 7, 2005, and claims priority from French Application Number 0501217 filed Feb. 7, 2005, the disclosures of which are hereby incorporated by reference herein in their entirety.

The present application is based on, and claims priority from, French Application Number 0501217, filed Feb. 7, 2005, the disclosure of which is hereby incorporated by reference herein in its entirety.

The present invention relates to devices for fixing objects by screwing them to supports.

It is more precisely a question of devices for fixing objects by screwing them to supports, such as sheets, "blind", i.e. when the support is accessible from only one side and is perforated with appropriate holes adapted to have parts of the device in question passed through them, as is frequently required in the field of bodies of road, rail, aeronautical and other vehicles, or even in the field of interior design or metal furniture.

It is more particularly directed to fixing devices of the kind in question that comprise a one-piece cage and a threaded part therein adapted to cooperate screw-fashion with a complementary threaded part to assure the required fixing and comprising four identical radial lugs extending in two orthogonal diametral directions and whose profile is such that the resulting cross-shape can be inserted with a small clearance into a square mounting hole. The cage itself is adapted to be introduced with a small clearance into the hole and to bear on the edges of the hole at the end of insertion of the cage therein.

Prior art fixing devices of the above type are described in the document FR-A-2 495 244 (U.S. Pat. No. 4,531,870) in particular and are generally satisfactory.

The present invention nevertheless aims to improve this kind of device.

To this end, the present invention proposes a one-piece cage for fixing device to an object by screwing blind to a plate or the like perforated by a square mounting hole, of the kind including that cage and, therein, a threaded part adapted to cooperate screw-fashion with a complementary threaded part to assure the required fixing, and comprising four identical radial lugs extending in two orthogonal diametral directions and whose profile is such that the resulting cross-shape can be inserted with a small clearance into the square hole, which cage is adapted to be inserted with a small clearance into the mounting hole and to bear on the edges of that hole at the end of the introduction of the cage therein, and is characterized in that it takes the general form of an elastically deformable U-shape having four lugs angularly offset at 90° to each other and adapted to receive contiguously between them the four lugs of the threaded part, the lugs being connected in pairs by two symmetrical bridges adapted to bear on the edges of the mounting hole.

This new form of cage provides a front surface that is inscribed inside a diameter less than the diagonal of the threaded part, which has the benefit of reducing the minimum increment for fitting two consecutive parts compared to the prior art solutions.

In practice, it is therefore possible to satisfy the constraint imposed by the standards of a minimum increment of 12.7 mm in 19-inch racks, for example (1 inch=2.54 cm).

Features of the cage of the invention preferred in particular for reasons of cost, convenience of fabrication and performance, include:

the two pairs of lugs respectively connected by a bridge are at an acute angle to each other;
the acute angle is less than 20°, preferably equal to approximately 12°;
at least one of the lugs includes a protuberance projecting towards the interior of the U-shape, by means of which the threaded part is retained in a lower position in its cage at least during fitting of the fixing device into the mounting hole;
each lug includes a protuberance facing a protuberance of the opposite pair of lugs;
the lugs have facing edges provided with protuberances lying in substantially the same plane, preferably one per edge;
each protuberance extends substantially half way along its lug;
each bridge forms, for the purposes of bearing engagement with the edges of the mounting hole, a rim at the summit of the pair of associated lugs, projecting towards the exterior of the U-shape, transversely to the lugs;
each rim takes the form of a segment of flange;
each segment has, between the pair of associated lugs, a groove through which a corresponding lug of the threaded part is adapted to be inserted into the cage;
each groove has an engagement bevel adapted to cooperate with the corresponding lug;
the cage has, in the lengthwise direction of the slot of the U-shape, a plane central portion forming the base of the U-shape and two appendices adapted each to extend under an associated lug of the threaded part, at least over the same radial distance as the latter;
each lug includes a boss configured to cooperate with a corner of the square mounting hole to immobilize the cage against rotation in the hole after fitting it; and
each boss has an inclined profile forming a thread portion adapted to cooperate for the purposes of movement conversion with the edges of the mounting hole at the end of the insertion of the cage into that hole.

The present invention also provides a combination comprising a cage as defined above and a threaded part.

Other features and advantages of the present invention will become more apparent on reading the following description, which is given with reference to the appended drawings, in which.

Figure 6C:
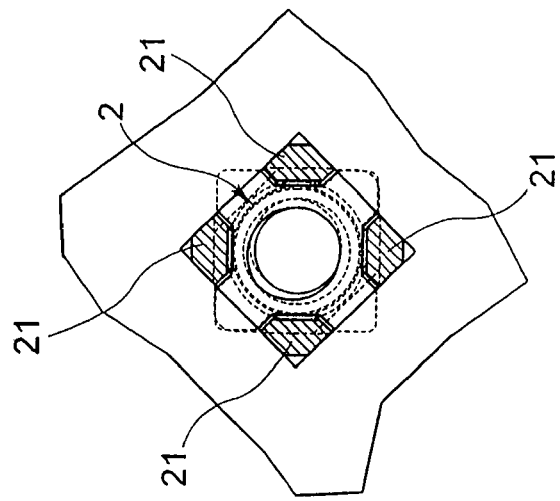
Figure 6B:
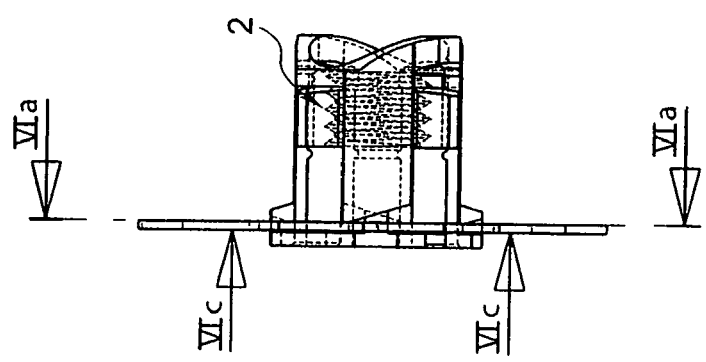
Figure 6A:
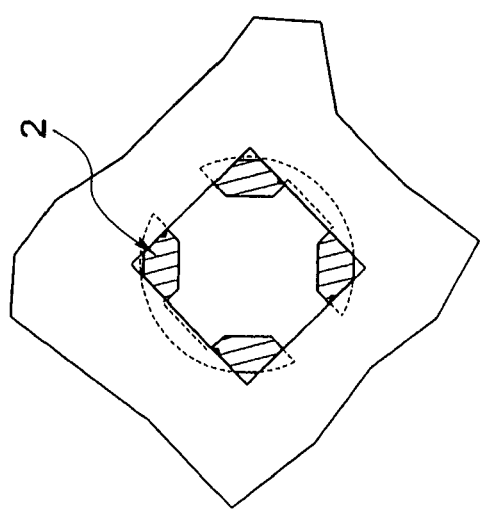

FIGS. 5a, 5b and 5c show the process of assembling the threaded component and the cage and inserting the resulting assembly into a square hole; FIGS. 5a and 5c are respectively sections taken along the lines Va-Va and Vc-Vc in FIG. 5b; and FIGS. 6a, 6b and 6c show the same process of assembling the cage and the threaded component, on which a ⅛-turn rotation has been imposed to fit it into place;

FIGS. 6a and 6c are respectively sections taken along the lines VIa-VIa and VIc-VIc in FIG. 6b.

The fixing device includes a prior art one-piece cage (1) and a prior art threaded part (2) disclosed in particular in the document FR 2 495 244 cited above. The threaded part (2), at least a portion of which is accommodated in the one-piece cage, is adapted to cooperate screw-fashion with a complementary threaded part (not shown) to assure the required fixing.

The threaded part (2), which is a bolt or a stud, is generally made of metal but could equally be made of a sufficiently hard plastics material.

This threaded part comprises four identical radial lugs (21) at an angle of 90° to each other to form a cross.

The cross formed by the lugs (21) is delimited by two transverse planes. It extends the full axial thickness of the threaded part if the latter is a bolt. If this part is a stud, this cross simply constitutes the head of the stud.

The cage (1) of the invention is of sufficiently small section to be introduced into the mounting holes provided in the support, for example a "blind" plate. The cage has the overall shape of a U (FIG. 4) and is elastically deformable, having four lugs (11) at an angle of 90° to each other and adapted to receive contiguously between them the four lugs (21) of the threaded part, the lugs (11) being connected to each other at the rear end of the cage (1) by a bottom (12) that is preferably pierced by a circular hole (13) and at the front end of the cage the two pairs of lugs being respectively connected to each other by two bridges (14) forming segments (15) of a flange (here segments of rectangular section), said segments being adapted to bear on the edges of the mounting hole into which the fixing device is inserted.

The two pairs of lugs connected to each other by said bridges form two windows (31). The inside face of the lugs (21) has a part-circular profile.

The material of the cage is preferably a sufficiently hard and elastic plastics material such as polyacetal, although the cage could equally be made of metal.

Figure 4:
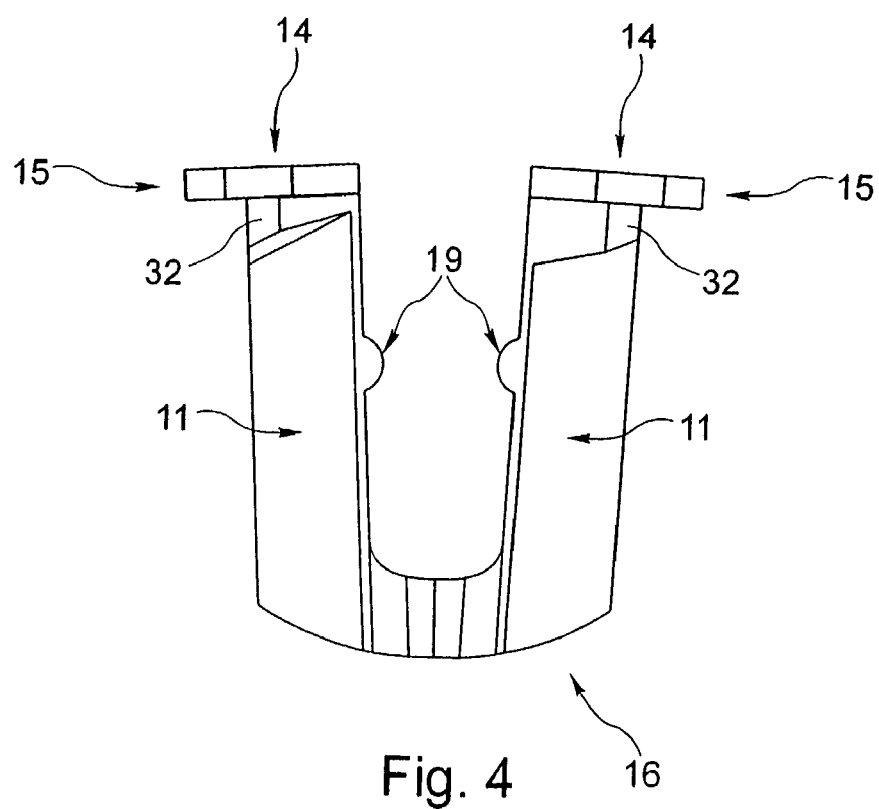

In the preferred embodiment shown in FIG. 4 in particular, the two pairs of lugs forming the lateral branches of the U are at an acute angle to each other, preferably equal to about 12°. After insertion of the cage into the mounting hole, this angle allows the lugs (11) to be pressed resiliently against the edges thereof. The bottom of the cage has a rounded profile (16) in the direction in which the U extends.

Figure 1:
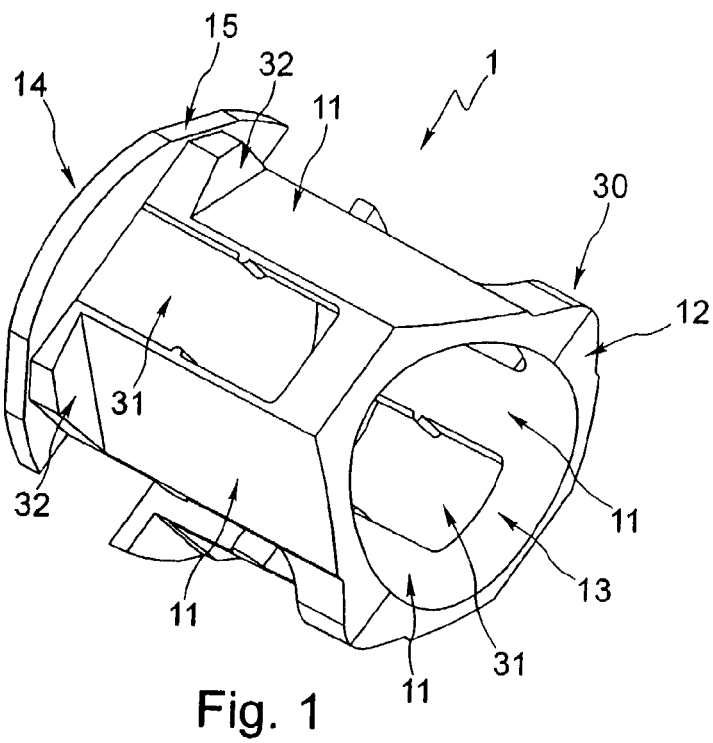
FIG. 1 is a three-quarter rear view of a cage of the invention for a fixing device.
Figure 2:
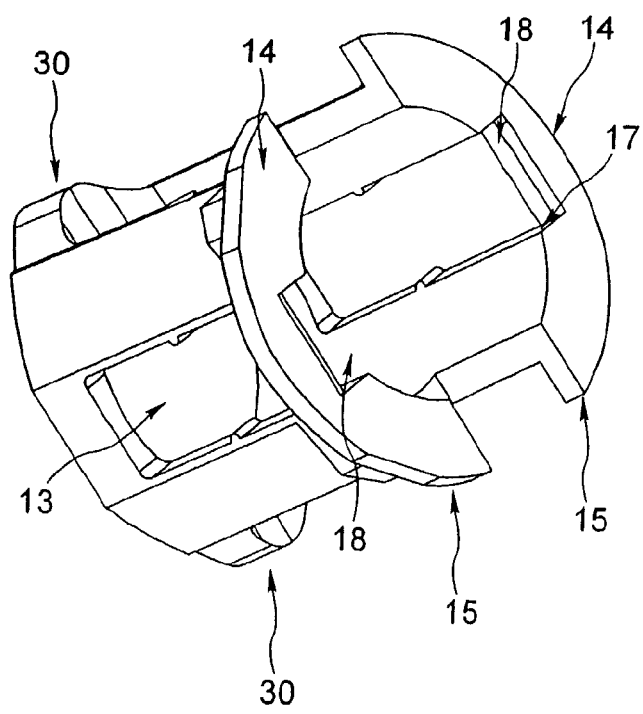
FIG. 2 is a three-quarter front view of the same device.
Figure 3:
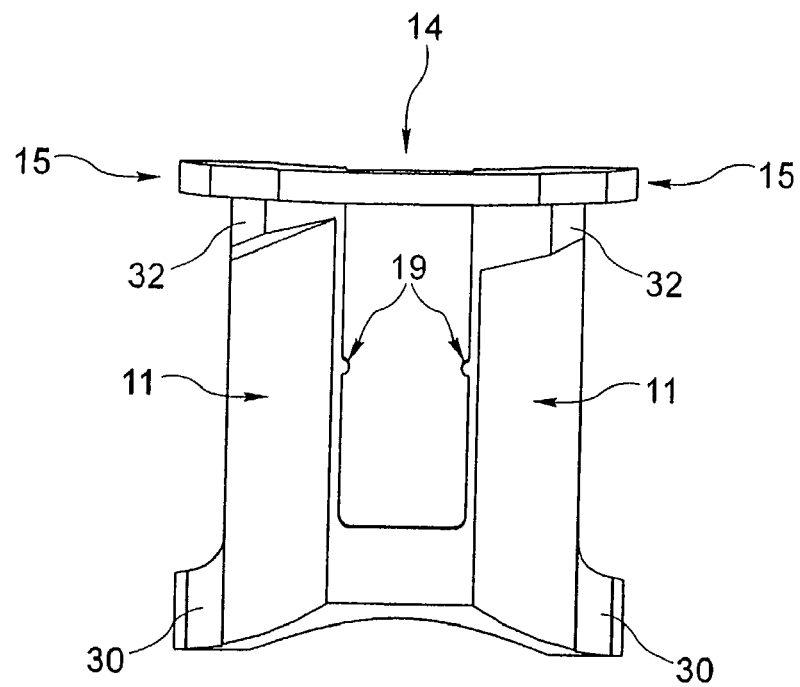
FIGS. 3 and 4 are side views of the same device offset at an angle of 90° to each other.

The front portion of the cage has, as seen particularly in FIG. 2, at the center of the bridges forming the flange, cut-outs (17) with inclined planes (18) provided to facilitate elastic deformation of the U-shaped cage, the insertion of the threaded member (2) with two diametrically opposite lugs (21) moving the two pairs of lugs (11) of the cage (1) apart by virtue of its shape cooperating with the inclined planes (18).

Retaining protuberances (19) are provided approximately half way along the edges of each of the four lugs forming the cage; once the threaded part (2) has been introduced into the cage (1), these protuberances (19) retain the threaded member in the rear portion of the cage upon insertion of the cage/threaded member assembly into the mounting holes provided for this purpose. Here the protuberances (19) projecting from the window of the U are larger than the others.

The bottom of the cage has set-back appendices (30) extending in the direction in which the U extends, said appendices (30) being each adapted to extend under a lug (21) associated with the threaded part (2) over a radial distance greater than or equal to that of the corresponding lug (21). These appendices are adapted to prevent the threaded member (2) encountering an edge of the mounting hole upon insertion of the threaded member/cage assembly therein and thus to prevent any retrograde movement of the threaded member (2) toward the rear portion of the cage (1), and even to prevent unintentional extraction of the threaded member (2).

Each of the lugs forming the cage (1) has, in the front portion thereof immediately under the bridges (14) forming the flange (13), a boss (32) having a trapezoidal cross section and an inclined profile. The profile of this boss (32) is adapted to enable a ⅛-turn rotation of the cage (1) relative to the mounting hole, advantageously by virtue of the cooperation of the shapes of said inclined profile bosses (32) and the edges of the hole upon insertion of the cage/threaded member assembly into said hole, the cooperation of these shapes transforming the insertion translational movement of the cage/threaded member assembly into the hole into rotational movement thereof relative to the mounting hole.

At the end of rotation, the trapezoidal section bosses (32) immobilize the cage in rotation relative to the square hole by virtue of its shape interfering with the corners of the latter.

This cooperation of shapes is visible in particular in FIGS. 5a to 6c, showing the final phase of insertion of the cage/threaded member assembly into the square hole and a ⅛-turn rotation to fit it into place in FIGS. 6a to 6c.

Note in particular in FIGS. 5b and 6b the inclined planes of the bosses (32) the shape whereof cooperates with the hole formed in the plate. As in FIGS. 5a, 6a, 5c and 6c, it may be seen that a ⅛-turn rotation corresponds to fitting into place and positioning the cage/threaded member assembly in the hole. FIG. 6c shows that in this position the lugs (21) of the bolt (2) have an angular position half way between two corners of the square hole.

Here the return movement of the threaded member (21) beyond the protuberances (13) may occur when fitting the screwing member into place, in order to press the threaded member against the inside ("blind") of the head.

The present invention is not limited to the embodiment described above, of course, but to the contrary encompasses all variant executions.

In particular, the retaining protuberances on the threaded part may be replaced by means adapted to retain the threaded part by clamping, such as frustoconical shapes.

The invention claimed is:

1. A fixing device, comprising an elastically deformable U-shaped cage, the cage including:
   a base and two lateral branches extending upward from the base and away from each other;
   four radial lugs extending upward from the base of the U-shaped cage in two orthogonal diametral directions; and
   two bridges configured to bear on edges of a square mounting hole in a support, each said bridge connecting upper ends of a pair of adjacent said lugs to define a respective one of said two lateral branches of the U-shaped cage, the lateral branches forming a non-zero acute angle with each other near the base as said branches extend upward from the base;
   wherein the base of the cage and the lugs are configured to be inserted into the square mounting hole with the bridges bearing on the edges of the mounting hole; and
   the bridges extend exclusively outwardly radially from the upper ends of the lugs.

2. The fixing device according to claim 1, wherein the acute angle is approximately 12°.

3. The fixing device according to claim 1, wherein at least one of the lugs includes a protuberance projecting towards the interior of the U-shaped cage.

4. The fixing device according to claim 3, wherein said protuberance of the at least one lug faces said protuberance of the opposite pair of lugs.

5. The fixing device according to claim 3, wherein the lugs have facing edges, each edge having said protuberance, the protuberances disposed in substantially a same plane.

6. The fixing device according to claim 3, wherein said protuberance extends substantially half way along its lug.

7. The fixing device according to claim 1, wherein each said lug includes a boss configured to cooperate with a corner of the square mounting hole to immobilize the cage against rotation within the hole.

8. The fixing device according to claim 7, wherein each said boss has an inclined profile forming a thread portion.

9. The fixing device according to claim 1, further comprising:
a threaded part assembleable with the case and having four corresponding lugs each being receivable between a respective pair of adjacent said lugs of the cage.

10. The fixing device according to claim 9, wherein said case has, between each pair of adjacent said lugs, a groove configured to receive there through a respective one among the corresponding lugs of the threaded part.

11. The fixing device according to claim 10, wherein each said groove has an engagement bevel adapted to cooperate with the corresponding lug.

12. The fixing device according to claim 9, wherein the base of the U-shaped cage has set-back appendices each adapted to extend under one of the corresponding lugs of the threaded part over a radial distance greater than or equal to that of the corresponding lug, so as to prevent the threaded part from encountering an edge of the mounting hole upon insertion of the threaded part assembled with the case into the mounting hole.

13. The fixing device according to claim 9, wherein
each of said branches of the U-shaped case has a window bordered by the base, the respective bridge and the respective lugs;
each said bridge has an inclined plane extending in a direction from an upper surface of the bridge downward toward the respective window for facilitating insertion of one of the corresponding lugs of the threaded part into the case.

14. The fixing device according to claim 1, wherein
each of the lugs has, along edges thereof, protuberances facing and projecting toward the adjacent lugs; and
the protuberances between the adjacent lugs that are not connected by the bridges are larger than those between the adjacent lugs that are connected by the bridges.

15. The fixing device according to claim 1, wherein
the lateral branches of the U-shaped cage are radially flexible toward and away from each other to vary the acute angle therebetween.

16. The fixing device according to claim 1, wherein
the bridges are connected to each other exclusively via the respective lugs and the base and, as a result, the lateral branches of the U-shaped cage are radially flexible toward and away from each other to vary the acute angle therebetween.

17. The fixing device according to claim 1, wherein the non-zero acute angle between the two lateral branches that flare upwardly from the base is less than 20°.

18. A fixing device, comprising an elastically deformable U-shaped cage, the cage including:
a base and two lateral branches extending upward from the base and away from each other;
two bridges configured to bear on edges of a square mounting hole in a support;
four radial lugs extending upward from the base of the U-shaped cage in two orthogonal diametral directions, each said bridge connecting upper ends of a pair of adjacent said lugs to define a respective one of the lateral branches of the U-shaped cage;
wherein
the bridges are free of direct connection to each other and, as a result, the lateral branches of the U-shaped cage are radially flexible toward and away from each other; and
at least one of the lugs includes a protuberance projecting towards the interior of the U-shaped cage, and said protuberance extends substantially half way along the respective lug;
the bridges extend outwardly directly from the upper ends of the lugs.

19. The fixing device according to claim 18, wherein an innermost face of each said lug has a profile of a circular arc.

20. A fixing device, comprising:
an elastically deformable U-shaped cage, the cage including:
four radial lugs extending from a bottom of the U-shaped cage in two orthogonal diametral directions and configured to bear on edges of a square mounting hole in a support;
two symmetrical bridges configured to bear on the edges of the mounting hole, wherein each said bridge connects a pair of the four lugs;
wherein each said lug includes a boss configured to cooperate with a corner of the square mounting hole to immobilize the cage against rotation within the mounting hole; and
wherein each said boss has an inclined profile forming a thread portion.

21. The fixing device according to claim 20, wherein an innermost face of each said lug has a profile of a circular arc.

* * * * *